United States Patent
Carroll et al.

(10) Patent No.: US 12,001,540 B2
(45) Date of Patent: *Jun. 4, 2024

(54) SYSTEMS AND METHODS FOR INTEGRATING WITH A NATIVE COMPONENT USING A NETWORK INTERFACE

(71) Applicant: Open Text SA ULC, Halifax (CA)

(72) Inventors: Jonathan Carroll, Beaconsfield (CA); Michel Gagnon, Candiac (CA); Gregory Pekofsky, Dollard-des-Ormeaux (CA); Khanh Tuan Vu, Montreal (CA)

(73) Assignee: OPEN TEXT SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,128

(22) Filed: Jul. 8, 2023

(65) Prior Publication Data

US 2024/0012900 A1    Jan. 11, 2024

Related U.S. Application Data

(63) Continuation of application No. 17/493,165, filed on Oct. 4, 2021, now Pat. No. 11,755,715, which is a continuation of application No. 16/592,460, filed on Oct. 3, 2019, now Pat. No. 11,176,239, which is a continuation of application No. 16/020,033, filed on Jun. 27, 2018, now Pat. No. 10,482,235, which is a continuation of application No. 15/000,881, filed on Jan. 19, 2016, now Pat. No. 10,037,422.

(60) Provisional application No. 62/106,023, filed on Jan. 21, 2015.

(51) Int. Cl.
G06F 21/00     (2013.01)
G06F 21/44     (2013.01)
H04L 9/40      (2022.01)

(52) U.S. Cl.
CPC .......... *G06F 21/44* (2013.01); *H04L 63/0823* (2013.01)

(58) Field of Classification Search
None
See application file for complete search history.

(56) References Cited

U.S. PATENT DOCUMENTS

| | | | |
|---|---|---|---|
| 6,976,174 B2* | 12/2005 | Terrell | H04L 69/03 726/22 |
| 8,813,125 B2* | 8/2014 | Reisman | H04N 21/4438 725/110 |
| 9,736,028 B2* | 8/2017 | Ansari | H04L 61/4552 |
| 2003/0028649 A1* | 2/2003 | Uhlik | H04L 67/14 709/228 |

(Continued)

*Primary Examiner* — Maung T Lwin
(74) *Attorney, Agent, or Firm* — Sprinkle IP Law Group

(57) ABSTRACT

Embodiments as disclosed herein may provide systems and methods for component integration and security. In particular, in one embodiment, a native component that presents a network based interface may be on a device, where that native component may expose a network based interface for access by other components. This native component can then be accessed through the network based interface. To address security concerns and other issues, the native component may be configured to determine if a received request is associated with the same user space and only respond to requests originating from the same user space.

21 Claims, 7 Drawing Sheets

(56) References Cited

U.S. PATENT DOCUMENTS

| | | | | |
|---|---|---|---|---|
| 2005/0044227 A1* | 2/2005 | Haugh | .................... | H04L 67/14 |
| | | | | 709/226 |
| 2007/0233869 A1* | 10/2007 | Jodh | ....................... | H04L 67/08 |
| | | | | 709/226 |
| 2010/0192072 A1* | 7/2010 | Spataro | ................ | H04L 65/403 |
| | | | | 709/227 |
| 2014/0282671 A1* | 9/2014 | McMillan | ........ | H04N 21/44008 |
| | | | | 725/19 |

* cited by examiner

SYSTEMS AND METHODS FOR INTEGRATING WITH A NATIVE COMPONENT USING A NETWORK INTERFACE

RELATED APPLICATION(S)

This application is a continuation of, and claims a benefit of priority under 35 U.S.C. § 120 from, U.S. patent application Ser. No. 17/493,165 by inventors Carroll et al., entitled "SYSTEMS AND METHODS FOR INTEGRATING WITH A NATIVE COMPONENT USING A NETWORK INTERFACE" and filed on Oct. 4, 2021, issued as U.S. Pat. No. 11,755,715, which is a continuation of, and claims a benefit of priority under 35 U.S.C. § 120 from, U.S. patent application Ser. No. 16/592,460 by inventors Carroll et al., entitled "SYSTEMS AND METHODS FOR INTEGRATING WITH A NATIVE COMPONENT USING A NETWORK INTERFACE" and filed on Oct. 3, 2019, issued as U.S. Pat. No. 11,176,239, which is continuation of, and claims a benefit of priority under 35 U.S.C. § 120 from, U.S. patent application Ser. No. 16/020,033 by inventors Carroll et al., entitled "SYSTEMS AND METHODS FOR INTEGRATING WITH A NATIVE COMPONENT USING A NETWORK INTERFACE" and filed on Jun. 27, 2018, issued as U.S. Pat. No. 10,482,235, which is a continuation of, and claims a benefit of priority under 35 U.S.C. § 120 from, U.S. patent application Ser. No. 15/000,881 by inventors Carroll et al., entitled "SYSTEMS AND METHODS FOR INTEGRATING WITH A NATIVE COMPONENT USING A NETWORK INTERFACE" and filed on Jan. 19, 2016, issued as U.S. Pat. No. 10,037,422, which claims a benefit of priority under 35 U.S.C. § 119 from U.S. Provisional Patent Application No. 62/106,023 by inventors Carroll et al., entitled "SYSTEMS AND METHODS FOR INTEGRATING WITH NATIVE COMPONENTS USING A NETWORK INTERFACE" and filed on Jan. 21, 2015, the entire contents of which are hereby fully incorporated by reference herein for all purposes.

TECHNICAL FIELD

This disclosure relates generally to the integration of native components with other components using a network based interface provided by the native component. More particularly, this disclosure relates to embodiments of systems and methods for the integration of a native component with other components using a network based interface provided by the native component, and the security of such native components.

BACKGROUND

Increasingly, in the computing world, functionality is distributed. Such distribution is achieved through the separation of the functionality or data (collectively resources), and the physical or logical decoupling of such resources. In order to accomplish certain tasks or applications, multiple resources may be needed. Thus, communications between various components may be required when implementing that functionality.

To illustrate, to accomplish functionality associated with, for example, an application on a mobile device, the application may communicate with one or more service providers that may be deployed at a remote location, such as on servers or in the cloud. These service providers may, in turn, contact content servers or database servers to obtain needed data, etc.

As another example, a cloud based service may have many components to facilitate, for example, deployability or scaling, where each component may be configured to accomplish different functionality of the service such that a central coordinating service component may need to communicate with these components in order to accomplish a task for the cloud based service.

As can be imagined, these types of architectures present certain difficulties. Some of the most concerning of these difficulties have to do with integration and security. In many cases, the resources that are needed (e.g., by a service) may reside in different domains comprised of an internetworked set of computers or applications associated with a particular entity, address, etc. However, entities that operate these domains restrict the access of a requestor to a resource within their domain if the requestor has not been authenticated within that domain. In other words, access to resources within a domain may be restricted to known or authenticated users of the domain.

While it may be prudent from the point of view of domain security, restricting access to resources of the domain to known users of that domain serves as a major impediment to proper functioning and communication between distributed resources. This situation exists mainly because, in many cases, a requestor (e.g., service or the like) may be required to communicate with a number of distinct domains and access a number of different resources to accomplish a particular task, and may even have to utilize different resources to accomplish different instances of the same task. A requestor may, however, not always be a known user of the domain where a desired resource resides.

In certain cases, then, integration between components (e.g., applications, data, etc.) has been provided by delivering components from remote service providers or the like and having these components execute on the recipient machine. This delivery is accomplished, in many instances, through a browser. For example, separately, or in conjunction with a web page accessed by the user, a component may be delivered through a user's browser and executed in conjunction with that browser on the user's device. While this serves to provide certain functionality, this method still limits the level or amount of functionality or access that can be utilized by that component, as these browser based (or other networked delivered) components are usually restricted in some manner (sometimes severely) because of security concerns.

Accordingly, what is needed are systems and methods which allow components, including browser based components, to be effectively integrated with a domain in a manner that allows these components a wide range of access to the functionality of that domain while maintaining a desired level of security.

SUMMARY

Embodiments as disclosed herein may provide systems and methods for component integration and security presented herein. In particular, a native component that presents a network based interface may be configured on a device where that native component may expose a network based interface for access by other components. This native component can then be accessed through the network based interface. To address security concerns and other issues, the native component that exposes the network interface may be configured, in certain embodiments, to respond only to connection or other requests (e.g., web services requests) issued from components on the same device.

Additionally, in some embodiments, to ensure the security of such native components, the native component may be configured to determine if a received request is associated with the same user space (e.g., user session) and only respond to requests originating from the same user space. This determination may be made using, for example, the port associated with the request and process identifiers associated with the request and the native component itself.

In one embodiment, a system may include a native component presenting a Transmission Control Protocol (TCP) or User Datagram Protocol (UDP) based network accessible interface for allowing functionality of the native component to be accessed through the network accessible interface. The native component may receive a request from a requesting component executing on the system through the network accessible interface, determine a first identifier associated with a first user space of the system in which the native component is executing by determining a first session identifier associated with the native component. The native component can also determine a second identifier associated with a second user space of the system in which the requesting component is executing.

In one embodiment, the second identifier may be determined by determining a port of a connection associated with the request, determining a process identifier associated with the requesting component based on the port of the connection associated with the request, and determining a second session identifier associated with process identifier.

The native component can determine if the first user space of the native component and the second user space of the requesting component are the same user space by comparing the first identifier to the second identifier and if the first identifier is associated with the second identifier, allow the request, and if the first identifier is not associated with the second identifier, deny the request.

In one embodiment, the requesting component and the native component may both be part of a cloud based managed file transfer (MFT) system. In a particular embodiment, the native component may be a transfer manager in the MFT system.

In some embodiments, the network accessible interface presented by the native component is a REpresentational State Transfer (REST) interface, a Simple Object Access Protocol (SOAP) interface or a Hypertext Transfer Protocol (HTTP) based interface.

In another embodiment, determining the process identifier associated with the requesting component comprises accessing a TCP table and determining the process identifier associated with the port of the request in the TCP table. The port may be a remote port associated with the request and the port of the request in the TCP table is a local port.

In one embodiment, the request received by the native component utilizes Secure Sockets Layer (SSL) and a connection is established with the requesting component using a certificate associated with the requesting component. The certificate may be associated with the second user space and is stored in a registry of the user on the system.

Embodiments as disclosed may thus provide the technical advantage of allowing distributed computer networks and functionality to be implemented more effectively through the use of native components by allowing such native components to be integrated with other components executing on the devices while still providing a desirable level of security and robustness in association with the deployment of such native components.

These and other aspects and advantages of the disclosure will be better appreciated and understood when considered in conjunction with the following description and the accompanying drawings. The following description, while indicating various embodiments and numerous specific details thereof, is given by way of illustration and not of limitation. Many substitutions, modifications, additions, or rearrangements may be made within the scope of the disclosure, and the disclosure includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

Figure 1:
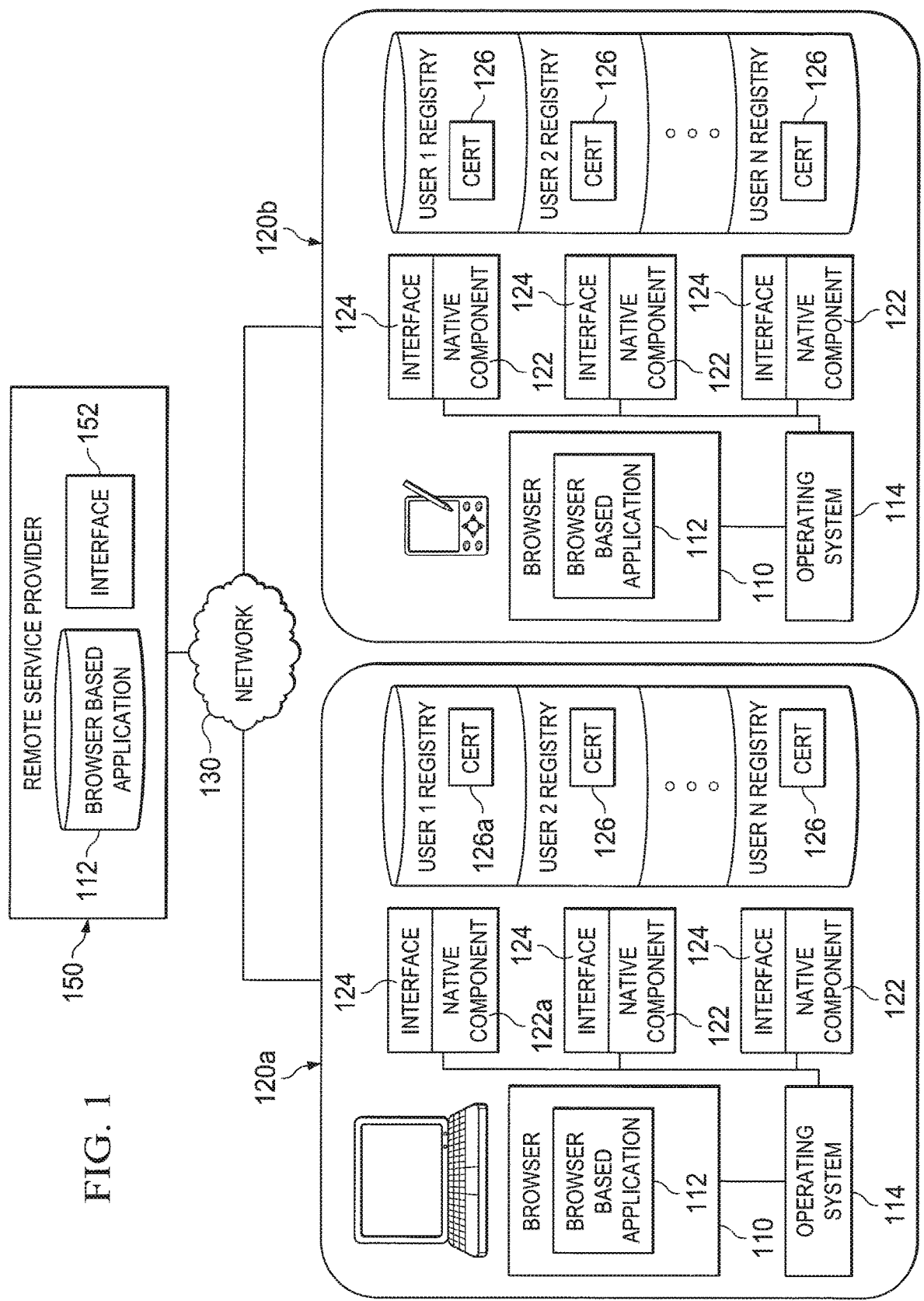
FIG. 1 is a diagrammatic representation of an example of a system and architecture for embodiments of component integration.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, some brief context may be helpful. As discussed above, functionality of computing systems is often times distributed. Components implementing various functionality of computer systems may therefore reside in different domains. A domain may include a logical grouping of network objects, such as an internetworked set of computers or applications associated with a particular entity, address, etc. Domains may also encompass a subdomain, which itself may be a domain contained in the parent domain, etc.

As components may reside in different domains, and it may be desired to grant access to a component from one domain to functionality provided by a component in another domain, problems relating to integration and security often crop up in distributed computing architectures. This situation exists because access to resources within a domain may need to be restricted to known or authenticated users of the domain.

In certain cases, then, integration between components has been provided by delivering components from remote service providers or the like and having these components execute on the recipient machine. This delivery is accomplished, in many instances, through a browser. The functionality or level of access of such components may, however, still be restricted precisely because of the aforementioned security concerns. Specifically, these browser based (or other networked delivered) components are usually restricted in some manner with respect to a domain into which they are introduced because of security concerns.

To improve the level of access, functionality, richness, and abilities of components in such distributed architectures, it is thus desirable to install components on computing devices and allow access to those devices from other components. These native components installed on a user's computer device may be given a wide range of access to functionality of the domain as they have been vetted by, and installed into, the domain. So, to continue with the above illustration, instead of a component being browser based, a browser based component would be configured to call (e.g., send a request for) or otherwise access the native component to achieve the desired functionality. In this manner, the desired functionality can be achieved by the native component, but may also be accessed in conjunction with the delivery of web pages or other components by remote service providers.

The use of such native components installed on a user's device brings up a whole host of problems, including for example, the need to restrict access to such a native component to a particular set of components or users. Again, to illustrate in more detail, because of the greater access and power a native component may offer, it may be desirable to restrict use of such a native component to only other components executing on the machine (e.g., not allow remote access to a native component) or to restrict access to only those other components executing within the same user space as the native component.

Such security may be difficult to achieve, as certain native components may have little or no knowledge about other components or users on the device. For example, native components that are providing a REpresentational State Transfer (REST) web service may have no way to "know" how to authenticate a user. To put this in the context of a web page for example: in certain instances, a web page may be created by connecting to a web site (e.g., in one example after a user is authenticated with this site). The web page content is downloaded to the browser, including code that will try to connect to a native component to provide, for example, a richer user-experience. The native component may need to trust or verify the incoming requests in order to grant such access. The native component may have just been installed without any configuration information or knowledge of what users, clouds or websites exist or may not be configured to have knowledge of such users, clouds or websites. The native component may thus be unable to properly authenticate requests, at least because the native component may not have any data regarding the specific user that originated these requests.

Moreover, without the ability to trust or verify requests such a native component may respond to requests, but with no guarantee, for example, that the requests do not belong to another session, or another user on the same machine. Even if a native component does exist on the same machine as the requestor, requests made to the native component may be coming from browsers running inside the user space of a different session (e.g., a user session) than the session in which the native component is running.

This situation is undesirable. If this native component is running, and it receives requests from a different session, it means that there are multiple concurrent sessions running. Since open ports allow connections from any session, it may be possible to have cross-session communication where users in other sessions may start have access to interface events that do not belong with their current context and may even have a view onto other users' activities or data.

Additional problems may also manifest as a result of the use of such native components. Specifically, components (e.g., browser based components provided through web pages or the like) may be designed to call a native component regardless of whether the native component exists or not. Thus, existence of the native component may be unknown from the perspective of other (e.g., requesting) components. The lack of, or compatibility of, such a native component may thus cause breakage of other components (e.g., browser based components or other requesting components, etc.).

Accordingly, what are needed are systems and methods, which allow native components to be effectively integrated with other components, including browser based components, in a manner that is robust and secure.

To that end, attention is now directed to the systems and methods for component integration and security presented herein. A native component that presents a network based interface may be configured on a device where that native component may expose a network based interface for access by other components. This native component can then be accessed through the network based interface.

Network based interfaces such as web service interfaces typically accept requests issued over a network using, for example, Hypertext Transfer Protocol (HTTP). To address security concerns and other issues, the native component that exposes the network interface may be configured, in certain embodiments, to only respond to connection or other requests (e.g., web services requests) issued from components on the same device. In some embodiments, this functionality may be accomplished by having such a native component listen on local ports of the machine on which it resides and only accepting connection (or other) requests from the localhost interface.

Additionally, in some embodiments, to ensure the security of such native components, the native component may be configured to determine if a received request is associated with the same user space (e.g., user session) and only respond to requests originating from the same user space. This determination may be made using, for example, the port associated with the request and process identifiers associated with the request and the native component itself.

It may also be possible, in certain embodiments, to ignore all requests when a session change event takes place. While this approach may work on most systems, it may not be as effective in cases involving a terminal server or the like, where not only are there multiple sessions, the sessions may all run at the same time. Thus, to support terminal servers (or other types of servers that may include or support multiple users or user spaces) with native components, request handling may not be disabled at all points. Thus, embodiments of native components that confirm that requests are originating from the same user space may be more effectively utilized in these types of scenarios, among others.

Embodiments as disclosed may thus allow distributed computer networks and functionality to be implemented more effectively through the use of native components by allowing such native components to be integrated with other components executing on the devices while still providing a desirable level of security and robustness in association with the deployment of such native components.

Referring first to FIG. 1 then, one embodiment of an architecture in which embodiments as disclosed herein may be used to allow browser based applications 112 provided by a remote services provider 150 over network 130 to access a native component 122 on computing devices 120 (e.g., devices 120a, 120b, etc.) is depicted. Network 130 may be the Internet, an intranet, a wireless or wired network, a LAN, a WAN, some combination of these types of networks, etc.

Here, browser based application 112 may be an application, such as those written in JavaScript, ActiveX, Flash, Silverlight, HTML5, etc. that may execute (i.e., the operations associated with the set of instructions comprising the application performed) in association with a browser 110 on a computing device 120. Browser 110 may be a web browser such as those known in the art, including, for example, Internet Explorer, Firefox, Chrome, etc., or may be another type of application configured to request, receive and execute browser based application 112 or a web page, etc. In many cases then, such browser based applications 112 may be provided in conjunction with a web page or the like.

Thus, browser 110 may request the browser based application 112 (or a web page associated with the browser based application 112, etc.) from an interface 152 provided by a remote service provider 150. This request may be initiated from another application (e.g., executing on computing device 120 or in conjunction with browser 110), as a result of a user interaction (e.g., with a web page or application, etc.), or for another reason. In response to such a request, the browser based application 112 is provided by the remote service provider 150 to the browser 110 at the computing device 120 where it is executed in conjunction with the browser 110.

As discussed above, to improve the level of access, functionality, richness, and abilities of components in distributed architectures such as the one pictured in FIG. 1, native component 122 may be installed on computing devices 120 and browser based application 112 configured to send a request to native component 122 to perform certain functionality.

Native component 122 may thus be configured to receive such a request, perform certain functionality, and return a response to browser based application 112 with a response to the call. To accomplish this, in one embodiment, native component 122 may include a network based interface 124 through which requests may be received and responded to. This network based interface 124 may be a REST web service interface, a Simple Object Access Protocol (SOAP) interface, another type of Transmission Control Protocol (TCP) or User Datagram Protocol (UDP) based communication protocol, etc.

Many browsers 110, however, are constrained by security models that strictly limit how browser based applications 112 (e.g., executing conjunction with web pages) are allowed to communicate. Specifically, certain browsers 110 impose security blocks on components such as applications or pages that make requests that fall outside of their associated domain. These types of blocks may mean the requests to, or responses from, domains other than the same domain from which the component itself was received, or requested, may be prevented. Additionally, these security blocks may confine requests to a specific protocol in order to protect users from malicious and common cross-domain script attacks. For example, browsers 110 may impose security blocks on pages that try to communicate with HTTP when the page itself was created by visiting a website via HTTP Secure (HTTPS). If the page itself was created by visiting a website with HTTPS, then the connection to localhost must also use HTTPS.

Accordingly, in some embodiments, native components 122 are associated with particular users of device 120 at installation. In particular, each native component 122 may be configured, at the time of installation, in conjunction with a particular user of the device 120 utilizing an associated trusted certificate 126 (e.g., stored in the user registry of that user on the device 120). For example, native component 122a may be associated with "User 1" and a trusted certificate 126a for native component 122a stored in the registry for "User 1" on the device 120a. In this manner, the native component 120 can utilize the associated trusted certificate 126 to negotiate and implement a secure connection (e.g., Secure Sockets Layer (SSL)/Transport Layer Security (TLS)) with the browser 110 (or browser based application 112).

In certain instances, $3^{rd}$ party certificate root authorities such as GlobalSign or Verisign may no longer support the signing of certificates for non-unique domain names, including localhost. In such case, a self-signed certificate may be utilized. Each installation of the native component 122 (e.g., an instance of the native component 122 associated with a particular user) creates its own self-signed certificate, and the user is prompted to allow the addition of the certificate to the trusted root certificate store (e.g., registry) on the device when the native component 122 for that user is installed.

In certain embodiments then, native component 122 may be configured to obtain an associated trusted certificate 126 to provide the certificate 126 to the browser 110 or browser based application 112 from the REST web service interface of the native component 122. The browser 110 (or browser based application 112) can then validate the returned certificate 126 by following the certificate chain of trust leading to the parent certificate authority (CA) certificate or self-signed certificate in the trusted root certificate store (e.g., the registry).

Additionally, to circumvent any security policy implemented by browsers that require requests to originate from the same origin (e.g., "same-origin security policy"), native components 122 may also be configured to respond to requests using one or more methods. For example, native component 122 may be configured to use cross-origin-resource-sharing (CORS)—where the native component 122 may explicitly respond to initial requests (e.g., "preflight" requests) that browser 110 may make before an actual cross-domain request is allowed. If the initial request is successful and supported by the target (e.g., native component 122), browser 110 permits the actual request to continue.

As some browsers 110 do not support CORS, native component 122 may support requests or responses utilizing JavaScript Object Notation (JSON) or JavaScript Object Notation with Padding (JSONP), a method used to download JavaScript from a different origin domain (which is allowed by most browsers 110). When browser 110 receives such resulting JavaScript from native component 122, it may be loaded into another frame and treated as the response to a request.

In any event, as discussed above, browser 110 may request the browser based application 112 from an interface 152 provided by a remote service provider 150. The browser based application 112 may then be received by, and executed in conjunction with, browser 110. As will be apparent to those of ordinary skill, it may not be the case that an appropriate native component 122 will be installed on every computer device 120 on which the browser based application 112 is executed. In other words, the native component 122 may not be installed at all on a computer device 120, may be an out of date version, etc.

Thus, browser based application 112 may first attempt to initiate a discovery process to make sure native component 122 (or an appropriate version of native component 122) is installed on the computing device 120 on which it is executing. This discovery process may include initiating a discovery of which network based interfaces (e.g., REST web services) are available. Such a discovery may be dependent on the type or version of browser 110.

For example, for Internet Explorer and Chrome, an iteration through a small static set of ports on localhost may be performed and an HTTP or HTTPS request (depending on the protocol utilized with the browser based application 112) issued to the native component 122 for each port. If browser based application 112 receives an HTTP response code of OK to an issued request, browser based application 112 can check that the version of the native component 122 is compatible, adequate, etc. If the version is compatible or adequate, browser based application 112 may continue with the communication to the native component as desired.

As another example, for Firefox, browser based application 112 can check for the existence of a plugin or interface such as the NPAPI (Netscape plugin API), which may be installed by the native component 122 when it is installed or configured on the computing device 120. If the NPAPI does not exist, browser based application 112 will proceed as if native component 122 is not installed on that computing device 120. If an NPAPI does exist, such a plugin may be utilized to ensure that the native component 122 is running. If native component 122 is not running and cannot be started, browser based application 112 will proceed as if native component 122 is not installed. Once, or if, the native component 122 is running, the port that the native component 122 is using may be obtained from the registry on the computing device 120 and returned back to browser based application 112.

The interface or plugin (e.g., NPAPI) may act as a proxy for the browser based application 112 to make the usual HTTP or HTTPS requests to the native component 122 similar to Internet Explorer and Chrome as discussed above. Since the interface or plugin executes in a native context, such an interface or plugin itself may only need to use HTTP to communicate to the native component 122, since in this instance, the browser 110 cannot block requests when protocol schemes (e.g., HTTP or HTTPS) do not match.

Once it is determined that the native component 122 exists on the computing device 120, the browser based application 112 may make a request to native component 122 through the interface 124 provided by the native component 122. This request may be, for example, a connection request or a request to perform certain functionality. In one embodiment, the interface 124 may be a REST interface and the request may be made according to such a REST web interface provided by the interface 124 of native component 122.

Native component 122 may receive such a request through the interface 124. As discussed above, for a variety of reasons, it may be desired to limit the requests that may be responded to by native component 122. Accordingly, native component 122 may be configured to accept connections or other requests only from the local device 120 by listening for and accepting connection only from the localhost interface on computing device 120. Thus, other devices (e.g., connected to network 130) cannot access native component 120. Accordingly, native component 122 may first determine if a received request originated from the localhost interface on the computing device 120 and, if not, an error (or other type of message) may be returned to the requestor, or no further action may be taken by native component 122.

Furthermore, in addition to accepting and responding to requests that came from the same device 120, it may also be desirable to ensure that a received request originated from within the same user space (e.g., that the requesting process, such as browser based application 112 or browser 110, is associated with the same user as the receiving native component 122). In one embodiment, this determination may be made based on the session (e.g., user session) associated with the requesting component, such that requests coming from a different session than the session of the native component 122 may be ignored or an error message returned through the interface 124.

Native component 122 may thus, in one embodiment, be configured to analyze a received request to determine the origin of that request. In one embodiment, requests received by the native component 122 (e.g., requests based at some level on TCP or UDP) may include information from which the remote port can be determined. In these embodiments, since every request includes the remote port of the connection (or the remote port can be determined based on the request), the remote port may be utilized to gather information about the requestor. Since the requesting process has been determined to be on the same machine (e.g., because native component 122 may excludes all requests not from the localhost interface as discussed above), then there exists a list of running processes that had to have initiated this request on this same device 120.

More specifically, in certain embodiments, native component 122 may determine all TCP connections on the device 120 (e.g., using a command to operating system 114). Such a list may include the ports that were used with the connection determined from the request. One of the enumerated TCP connections in the list should have a matching source port that is equal to the remote port that the native component 122 determines is associated with the received request.

In other words, the source port of the connection associated with the received request is browser 110 (or browser based application 112) from the perspective of the device 120, and the remote port of the request is the browser 110 (or browser based application 112) from the perspective of native component 122. Enumerating all TCP connections on the device 120 by native component 122 gives a list of all processes where one of these processes is the source of the received request. The source port from this list that matches the remote port associated with the request received at the native component 122 may give matching data with the following information: [source port, process ID]. The process ID of that match is the process ID of the browser 110 (e.g., executing browser based application 112). It may then be possible for native component 122 to obtain the session ID for the given process ID by issuing one or more commands to operating system 114.

Native component 122 may be configured to accept the received request if that session ID is the same as the session ID of the native component 122. In other words, native component may be configured to determine its own session ID and if the session ID of the native component 122 matches the session ID determined from the received request (i.e., the session id of the requesting component), native component 122 can confirm that the user comes from the same device 120 and the same session without the need to know any other kind of authentication information about the user (e.g., the user whose browser 110 or browser based application 112 issued the received request). If the user is authenticated (e.g., the session IDs match), native component 122 may service the request (e.g., perform requested functionality) and return a response to the request through the interface 124.

Figure 2:
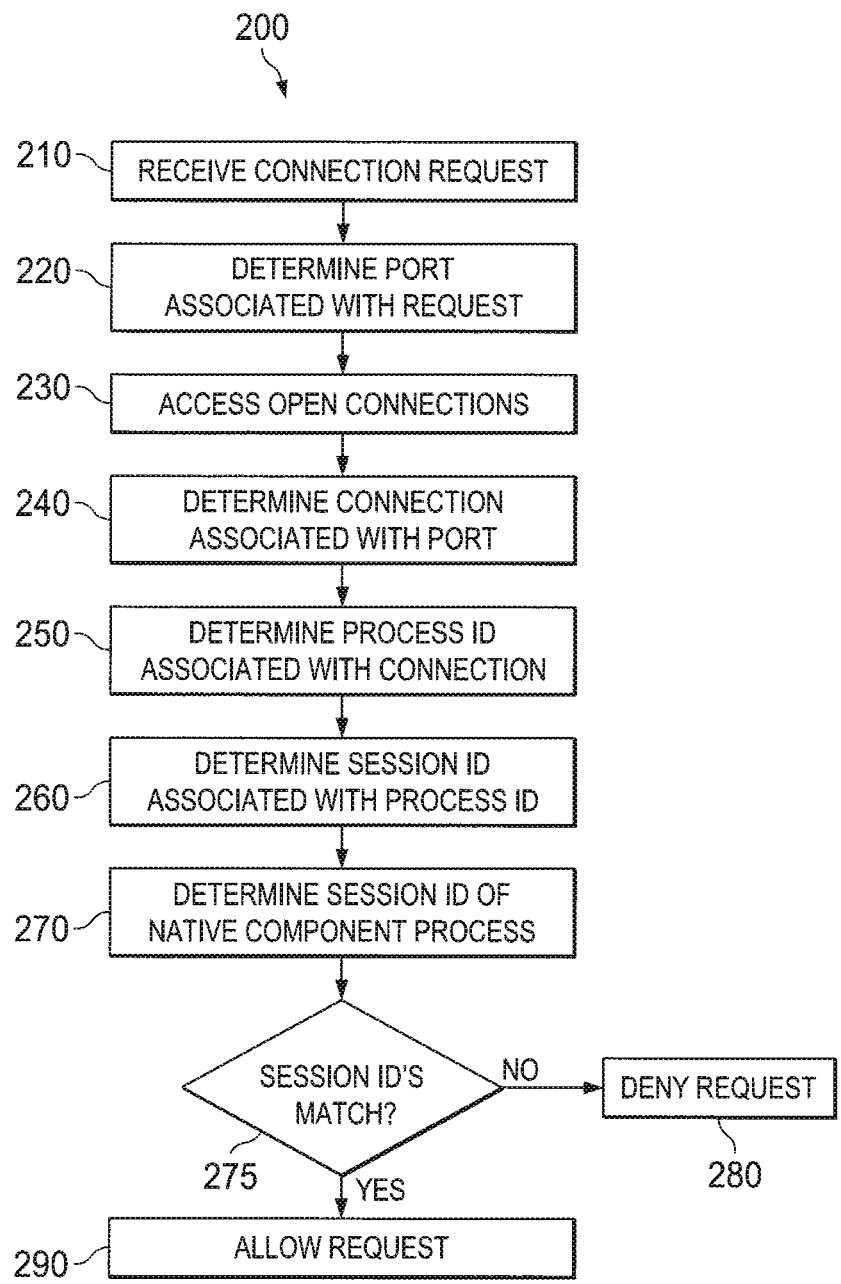
FIG. 2 is a flow diagram illustrating an embodiment of a method for component integration.

FIG. 2 depicts one embodiment of a method 200 for integrating components, including authentication of requests at a native component. As discussed above, a native component on a computing device may expose an interface such as a RESTful web service interface or other type of network based interface. A browser based application executing in conjunction with a browser on the device may cause a request (e.g., from the browser) to be communicated to the native component through the interface. The native component may receive the request at step 210. In one embodiment, an SSL negotiation may take place between the browser and the native component based on a certificate associated with the native component in the registry of the device on which the native component is installed. Such a certificate may have been installed at the time of installation of the native component on the computing device, may be a self-signed certificate, etc.

At this point, it can be determined if the received request comes from the localhost on the computing device or from a remote location. If the request comes from a remote location (i.e., not the localhost) the request may be rejected, an error message returned through the interface or another action taken.

If, however, the request originated from the localhost, the port associated with the received request can be determined at step 220. In one embodiment, the native component may retrieve the remote port of the received request. This may, for example, be determined from data associated with a socket associated with the received request. This remote port may be the source port of the requestor (e.g., the browser or browser based application). For purposes of an illustrative example, assume that a remote port associated with a request is determined to be 54428.

The native component can then access the open connections on the device at step 230. This access may entail using a command provided by the operating system of the device to enumerate the open connections (e.g., as an extended TCP table). This list may include the source ports of all open connections and the corresponding process IDs for the connection. This command may be a Windows system API call. For instance, in order to enumerate the TCP connections, in one embodiment the native component may use the command GetExtendedTcpTable with the TCP_TABLE_OWNER_PID_CONNECTIONS parameter.

The resulting table of connections is returned in a buffer. Continuing with the above example, suppose that the table returned in response to a GetExtendedTcpTable command is:

| LocalAddress | LocalPort | RemoteAddress | RemotePort | owningPid |
|---|---|---|---|---|
| 127.0.0.1 | 53172 | 127.0.0.1 | 53171 | 1432 |
| 127.0.0.1 | 54268 | 127.0.0.1 | 3000 | 3412 |
| 127.0.0.1 | 54428 | 127.0.0.1 | 3000 | 4372 |

Using this list of open connections, the connection associated with the port of the received request (e.g., the remote port) may be determined at step 240. In one embodiment, this connection may be determined by determining a connection with a source port that is the same as the remote port as determined from the received request. The process ID associated with that connection can then be determined at step 250. With respect to the above example, the native component iterates through the rows of the table until it finds the local port for the port that matches the remote port determined by the native component for the request. In this case, the iteration can be stopped once the local port of 54428 is found by the native component. The corresponding "owningPid" (4327) associated with the matching port 54428 is the owning process identifier of the requesting process.

The session ID associated with this determined process ID (e.g., owning process identifier) can then be determined at step 260 (again, for example, using an operating system command). Specifically, in one embodiment, the function ProcessIdToSessionId (as provided by the Windows operating system for example), may be called with the process identifier as an input parameter. In the above example, the process identifier to use as an input parameter would be 4372. The parent session id of the requesting process is received as a return from the call to this function.

Additionally, the session ID of the native component itself may be determined at step 270 (using, for example, an operating system command). In one embodiment, the native component may call the Process.GetCurrentProcess( ).SessionId function (e.g., as provided by the Windows operating system for example) to get the session ID associated with the native component. At step 275, the session ID associated with the received request (e.g., of the requesting process) as determined at step 260 may then be compared with the session ID of the native component as determined at step 270. If the session IDs match, the request may be allowed at step 290, functionality associated with the request performed by the native component, and an appropriate response returned through the interface by the native component. Alternatively, if the session IDs do not match, the received request may be denied and an action (e.g., an error message, etc.) taken by the native component.

Embodiments may therefore provide an improvement in computer performance among other advantages by providing a robust and secure method and system for integrating distributed components as may arise in modern distributed networked computer architectures. Specifically, by integrating components through the presentation of a network based interface such as a RESTful web service interface, a native component may be integrated with other components using a common, robust and powerful interface. Additionally, however, by confining the requests that such a native component may accept through such an interface to those originating through the localhost or from the same user space, the security concerns of allowing access to such a native component by other components, including those that may be received from remote locations, may be addressed.

As will be apparent then, embodiments as have been discussed herein above may be applicable to a wide variety of architectures and distributed systems, including multi-tenanted architecture designed for access by many unaffiliated requestors and high scalability. However, it may be useful to an understanding of various embodiments to depict the application of one embodiment with respect to a particular architecture, in this case a managed file transfer setting. Managed file transfer ("MFT") refers to a solution for managing secure network data transfer from one computer to another over private and/or public networks, including the Internet. In some instances, such a solution is an enterprise class solution tailored to the needs and desires of an enterprise. Compared to ad-hoc file transfer solutions such as file transfer protocol ("FTP"), MFT provides a higher level of security and control over the payload as well as the transmission of large volumes of bulk data between entities.

MFT applications are available as either on-premises licensed software packages or off-premises software-as-a-service ("SaaS"). SaaS refers to a software delivery model where the software and associated data are hosted and accessible on a client device communicatively connected to a server machine in the cloud. In some instances, the software and associated data are hosted in the cloud and accessible by a user. The user may use a thin client and such a thin client may be integrated with a web browser executing on the client device. Cloud computing is a synonym for distributed computing over a network, a non-limiting example of which includes the Internet, and involves a number of computers connected through the network.

Figure 3:
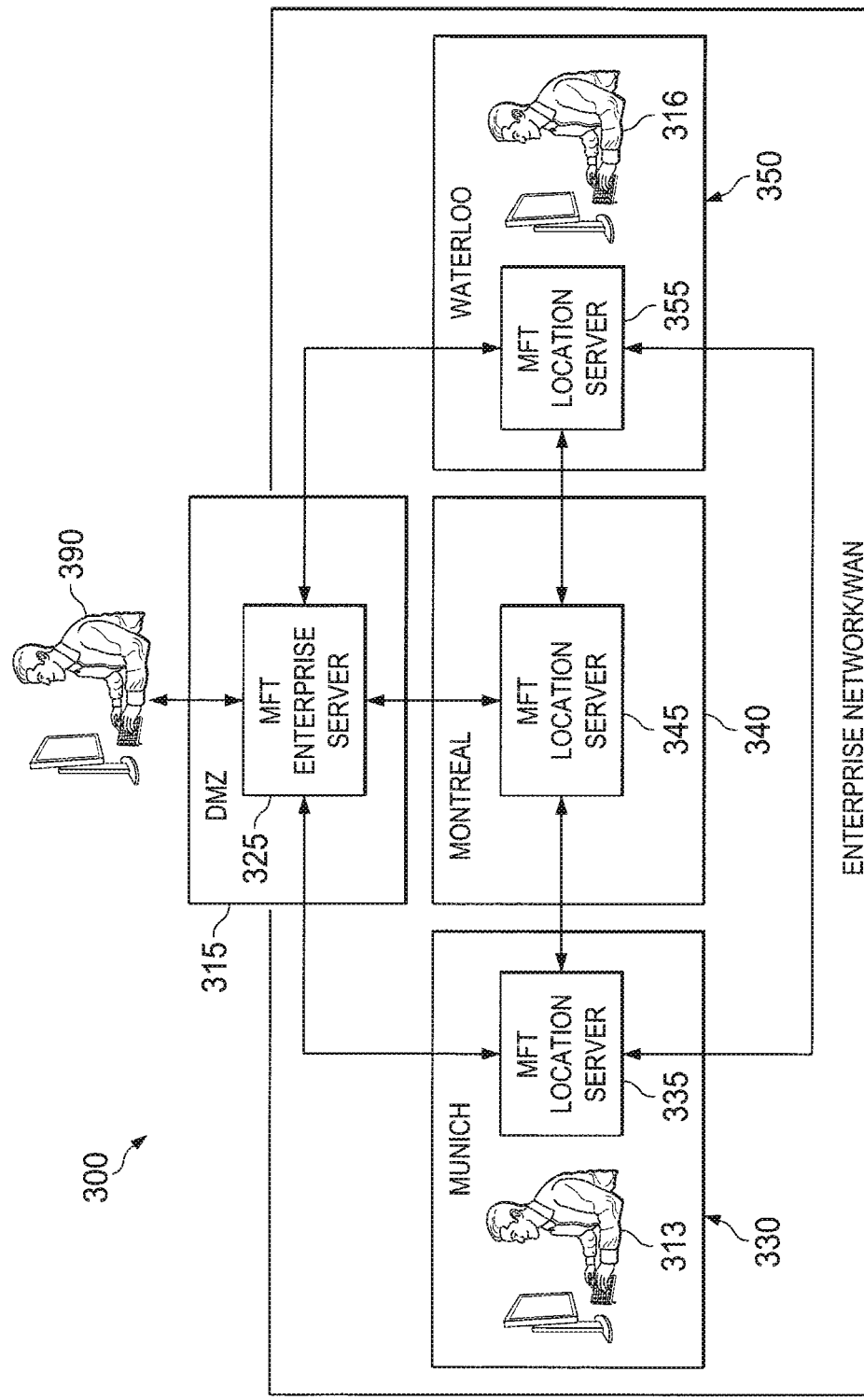
FIG. 3 is a diagrammatic representation of an example of a data transfer system and architecture.

FIG. 3 depicts a diagrammatic representation of an example of an on-premises data transfer system and architecture. In this example, system 300 includes MFT enterprise server 325. Several MFT location servers 335, 345, and 355 are communicatively connected to MFT enterprise server 325 and to each other via enterprise network 310 which, in one embodiment, can be a wide area network ("WAN"). An MFT enterprise server has a number of components including an MFT web service, an MFT transfer server, a file server, a database server, and an authentication server. The MFT web service provides the frontend services to users such as setting up and tracking transactions. The transfer server takes care of the server (host) side of a file transfer. Other components such as user authentication, database, etc. are not relevant for the purpose of this disclosure.

Each MFT location server resides at a geographic location and can be said to serve a particular group of individuals, non-limiting examples of which include those proximate to the geographic location and/or are served by a location server at an organization's office or those who are members of a particular group. For example, MFT location server 335 may reside at first location 330 (in this example, Munich, Germany), MFT location server 345 may reside at second location 340 (Montreal, Canada), and MFT location server 355 may reside at third location 350 (Waterloo, Canada). An MFT location server may have an MFT transfer server and a file server, but may not have an MFT web service, a database server, or an authentication server. In a typical MFT setup, in either an on-premises or cloud version (see, e.g., FIG. 4), MFT location servers are a subset of a main MFT enterprise server because they have no web services or databases. MFT location servers are servers that can perform file transfers and that can be quickly added.

As illustrated in FIG. 3, MFT location servers 335, 345, and 355 are all behind (Demilitarized Zone) DMZ 315 of enterprise network 310. In computer security, a DMZ refers to a physical or logical sub-network that contains and exposes an enterprise's external-facing services to a larger, untrusted network such as the Internet. MFT enterprise server 325 connects MFT location servers 335, 345, and 355 to the outside world (e.g., the Internet) via DMZ 315.

If user 316, who is an employee of the enterprise at location 350 wants to send a large file to user 390 who is outside of enterprise network 310, that transfer will take place through MFT enterprise server 325 at DMZ 315 and then go outside to the world. Meanwhile, if employee 316 at location 350 wants to send a large file to employee 313 at location 330, it will be MFT location server 355 at location 350 taking that file from employee 315 at location 350 and forwarding it automatically to MFT location server 335 at location 330. MFT location server 335 at location 330 then forwards the file to employee 313 at location 330. In this case, the file itself does not have to go through DMZ 115.

In the on-premises setup shown in FIG. 3, the MFT location servers are "on location" (on a company's enterprise network), under control of an enterprise such as an information technology ("IT") department of a company. This means that they deal with one known set of users, run on a network that the enterprise controls, so the firewall is not an issue, since they are all within the purview and control of the IT department of the enterprise. However, since the MFT enterprise server is located inside the DMZ, setting up an on-premises MFT solution is a complex and complicated process. For example, the entity that offers the on-premises MFT solution often needs to involve network security and/or IT personnel from their enterprise customer to get the right port opened in the enterprise network's DMZ so the MFT enterprise server inside the DMZ can send data to and receive data from the outside world through the DMZ. On the other hand, the network security and/or IT personnel from the enterprise may not have the knowledge necessary to maintain the MFT enterprise server, which may result in repeated on-site visits to maintain/service the MFT enterprise server running inside the DMZ. Furthermore, some enterprises may not have the necessary resources to implement the on-premises MFT solution.

An off-premises MFT solution can avoid these issues by hosting MFT services in the cloud, thereby off-loading many of the technical setup, operational, and maintenance challenges to a hosting service. With the off-premises MFT solution, enterprises do not have to host an MFT enterprise server inside their DMZ and do not have to have any MFT location servers on their private network. They can avoid complicated setup in the DMZ, avoid getting network security and/or IT personnel involved in terms of getting the right port opened, avoid having to host transfers to outside people, etc.

Figure 4:
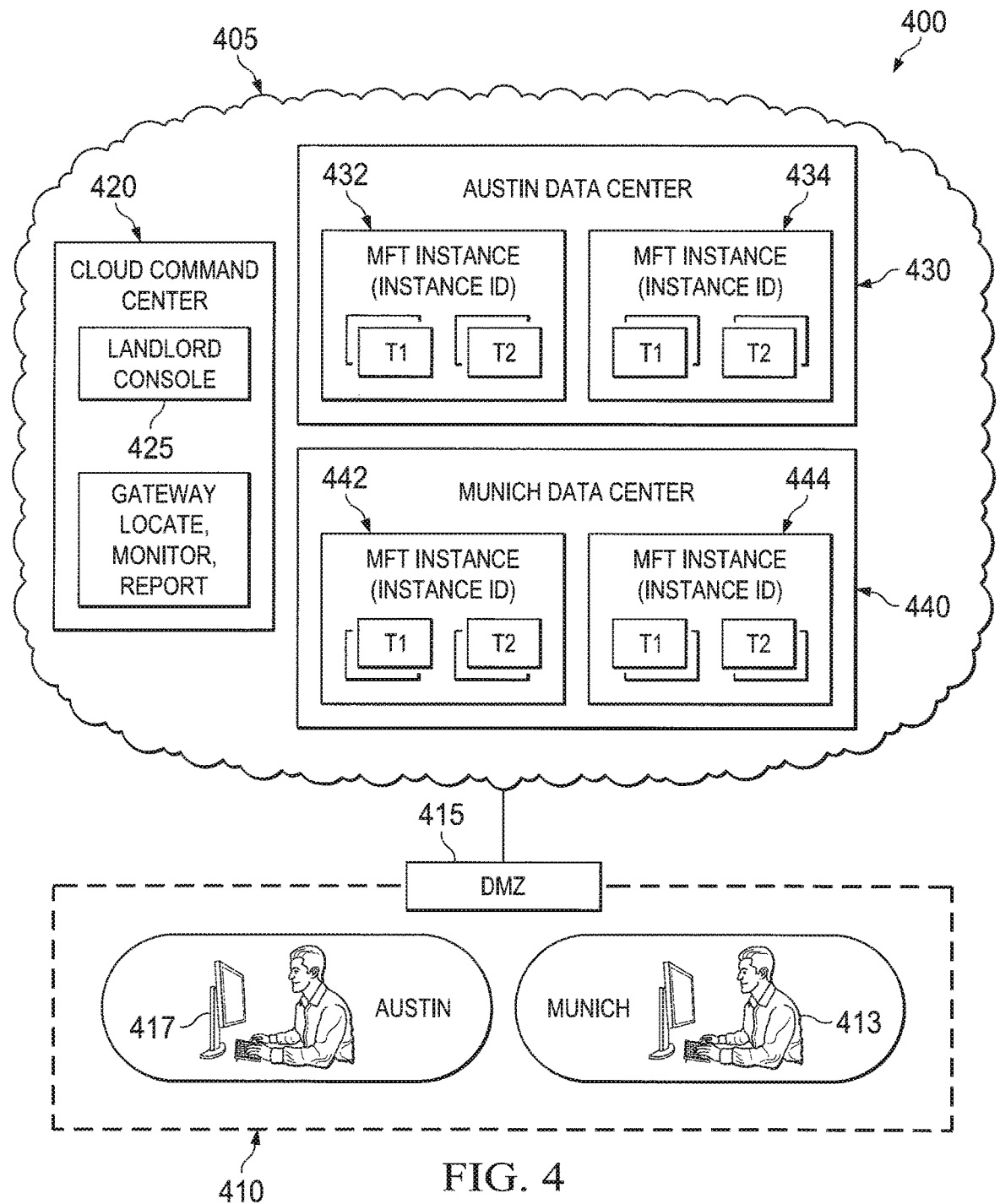
FIG. 4 is a diagrammatic representation of an example of an off-premises data transfer system and architecture.

FIG. 4 depicts a diagrammatic representation of an example of an off-premises data transfer system and architecture. In this example, system 400 includes cloud 405 providing data transfer services to employees 417, 413 in enterprise network 410 via DMZ 415. In physical terms, cloud 405 is made of command center 420 (e.g., also referred to as a cloud command center) and data centers 430, 440. Command center 420 may reside in data center 430, data center 440, or another data center or server machine.

As those skilled in the art will appreciate, cloud 405 is configured for multi-tenancy. In cloud computing, multi-tenancy refers to a principle in software architecture in which a single instance of the software runs on a server to serve multiple client-organizations (tenants). In the example shown in FIG. 4, data center 430 has MFT instances 432, 434 running and data center 440 has MFT instances 442, 444 running. Command center 420 may have landlord console 425 running to serve multiple client organizations (tenants). Each MFT instance can have one or more tenants and can be thought of as an MFT enterprise server described above. In the example shown in FIG. 4, each MFT instance has two tenants T1, T2.

These tenants are customers (e.g., businesses, companies, enterprises, corporations, organizations, etc.) who purchased or subscribed to MFT services from the cloud operator of cloud 405 and got on-boarded to an MFT server in cloud 405. Many of the tenants can be on-boarded to the same physical server. The physical make up and configuration of server machines in cloud 405 are transparent to the tenants.

In FIG. 4, the entity that owns enterprise network 410 may be tenant T1 or tenant T2. Because everything runs in cloud 405, no MFT components run on the entity's premises. All file transfers go through DMZ 415 and are performed by MFT servers sitting in cloud 405. If employee 417 wants to make a file transfer to employee 413, that transfer will begin by employee 417 sending a file from a computer on enterprise network 410 to cloud 405. Employee 413 will receive the file through cloud 405 (via the MFT instance hosting the entity's MFT service) and back to enterprise network 410 again.

This off-premises, cloud based MFT solution is advantageous for handling data transfers that take place between people who are not on-premises. However, as the above example illustrates, the off-premises MFT solution can lose some efficiency as compared to the on-premises MFT solution described above with reference to FIG. 3. For example, because there are no MFT location servers within an MFT tenant's private network, each file transfer must take place through the cloud, even if both the sender and the recipient are on the same MFT tenant's private network.

Embodiments provide a hybrid on-premises/off-premises MFT solution that can take advantage of the benefits and features of both the on-premises MFT solution and the off-premises MFT solution. In a hybrid on-premises/off-premises MFT solution, some MFT components are located on-premises and some are hosted in the cloud.

Figure 5:
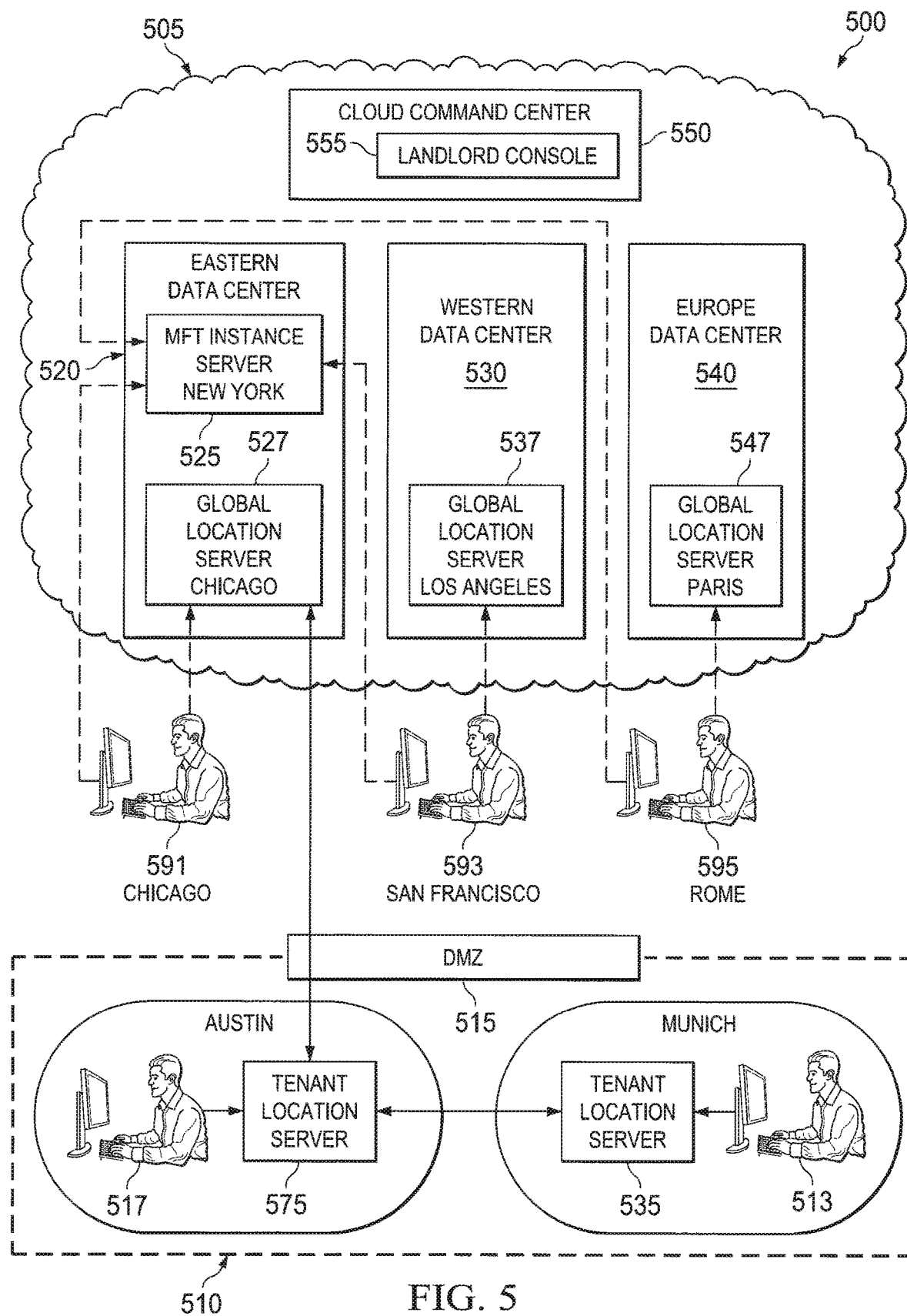
FIG. 5 is a diagrammatic representation of an example of a data transfer system and architecture.

In the example of FIG. 5, system 500 comprises data centers 520, 530, and 540 hosted in cloud 505. These data centers are physically located remote from one another. As illustrated in FIG. 5, in some cases, data centers may be located across continents. Each data center may comprise a location server which is hosted in cloud 505 and thus off-premises of any customer's private network. These off-premises location servers may be referred to as global location servers. In this example, data center 520 may comprise global location server 527, data center 530 may comprise global location server 537, and data center 540 may comprise global location server 547. Eastern data center 520 may further comprise MFT instance 525 which, in this example, executes on a server machine located in New York, while global location server 527 is located in Chicago.

On-premises location servers installed inside a customer's private network may be referred to as tenant location servers. Such a private network may be a wide area network or a local area network ("LAN"). As illustrated in FIG. 5, tenant location servers 575, 535 may reside in enterprise network 510, behind DMZ 515. However, unlike the on-premises MFT solution illustrated in FIG. 3, there is not an MFT enterprise server inside DMZ 515.

For the purpose of illustration and not of limitation, FIG. 5 shows a single tenant's enterprise network 510. However, as those skilled in the art will appreciate, cloud 505 may serve multiple tenants. Further, each data center may separately run an MFT instance hosting multiple tenants, as described above with reference to FIG. 4. Cloud command center 550 may run landlord console 555 to serve these tenants.

Architecturally, a hybrid on-premises/off-premises solution for an individual tenant may comprise off-premises MFT components and on-premises MFT components. In some embodiments, a hybrid on-premises/off-premises solution for an individual tenant may comprise a single MFT instance and at least one global location server hosted in the cloud, and at least one tenant location server within a private network.

User 517 and user 513 may work for the entity that owns enterprise network 510. Suppose user 517 who is in Austin, Texas, U.S.A. wants to transfer a file to user 513 who is in Munich, Germany. In an example implementation that did not include on-premises tenant location servers 575, 535, the file would have to transfer from a computer of user 517 inside enterprise network 510, to an external off-premises location server on the Internet through DMZ 515 and stored in the cloud. User 513 would have to download the file from that cloud storage location which would tend to be closer to either user 517 or user 513. If user 513 downloaded the stored filed from a US-based data center closer to user 517 (such as data center 520 or 530), user 513 will likely experience longer transfer times because of the distance between the US-based data centers and Germany. The reverse would be true if the file were transferred to a European data center for storage (such as data center 540).

Figure 6:
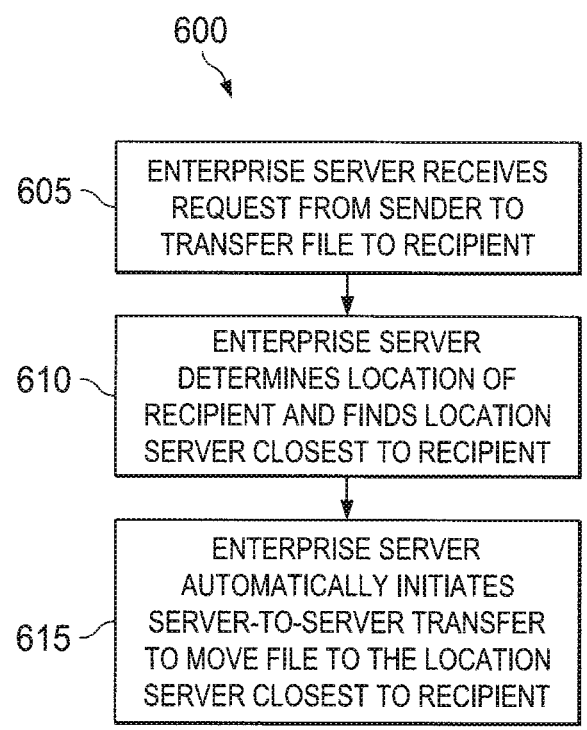
FIG. 6 is a flow diagram of an embodiment of a method for data transfer.

In contrast, in the hybrid topology, location servers are installed on-premises and may be referred to as tenant location servers, as described above. Operationally, when user 517 wants to send files to user 513, tenant location servers (575, 535) can be involved in transferring the files such that tenant location server 575 transfers files to tenant location server 535 closer to user 513. Such a file transfer takes place entirely within the enterprise network 510, without the need for off-premises location servers. In this way, more generally, the hybrid topology can be said to reduce file transfer time for on-premises users, at least once the file is transferred to a tenant location server servicing a user. This is further described below with reference to FIG. 6, which depicts a flow diagram illustrating an example of a method for hybrid on-premises/off-premises data transfer.

As a specific example of method 600, user 517 (sender) may send a request to cloud 505 to transfer a file to user 513 (recipient). In step 605, the request may be received by MFT instance 525 which runs an MFT web service for enterprise network 510. The file itself (bulk data) is uploaded from a computer of user 517 to tenant location server 575 inside enterprise network 510, out to the Internet through DMZ 515, to global location server 527 which is located in Chicago and which is the closest to user 517.

In step 610, MFT instance 525 may determine a location of user 513 and find a location server that is the closest to user 513. In step 615, MFT instance 525 may automatically initiate a server-to-server transfer to move the file to the location server that is the closest to user 313 and the location server then notifies user 313 that a file is waiting for him. The determination as to what constitutes the "closest" location server may be influenced by whether a pull operation or a push operation is to be used. For example, if a push operation is used, tenant location server 535 may be considered as the closest location server to user 513 and the file is "pushed" through DMZ 515 to tenant location server 535. In some cases, it may be easier to traverse a DMZ via a pull operation. If so, global location server 547 which is located in Paris, France, may be considered as the closest location server to user 513 who is in Munich, Germany. Thus, in this case, the file is moved to global location server 547; MFT instance 525 notifies tenant location server 535 of the requested transfer to user 513 and where the file is located (on global location server 547); and tenant location server 535 then notifies user 513 that a file is waiting for him.

In some embodiments, users and location servers can be located via network addresses or ranges of network addresses such as Internet Protocol ("IP") addresses. In some embodiments, moving files closer to the recipients may significantly improve the performance of large file transfers. In some embodiments, moving files closer to the recipients may allow the transfers to leverage high speed LANs instead of WANs. In some embodiments, transfers among users within a private network can be incorporated in one or more rules. Examples of rules may include "if a server is defined for a user, that location server will be used for that user"; "if the IP address of a sender is defined, use a location server that corresponds to the sender"; and "if the IP address of a sender is not defined, use geo-location to find the nearest location server." These rules may be applied in order.

Users outside of an enterprise network may also utilize the hybrid on-premises/off-premises solution to send and receive large files to and from users inside of the enterprise network. For example, user 591 in Chicago, user 593 in San Francisco, and user 595 in Rome may be business partners, suppliers, service providers, etc. who communicate with users 513, 517 inside of enterprise network 510. Suppose user 595 wishes to send a large file to user 517 and sends a request to cloud 505. The file is uploaded to the location server that is the closest to user 595 which, in this case, is global location server 547 in data center 540. The request from user 595 is received by MFT instance 525 hosted in cloud 505. MFT instance 525 may authenticate user 595 and determine that user 595 is in Rome and that the file is stored on global location server 547 in data center 540. Since users outside of enterprise network 510 may not have defined IP addresses, MFT instance 525 may determine their locations using a geo-locating methodology. MFT instance 525 may further determine that the intended recipient, user 517, is located in Austin and that the file should be moved to global location server 527. MFT instance 525 may then initiate a server-to-server transfer operation to transfer the file from global location server 547 in data center 540, to global location server 537 in data center 530, to global location server 527 in data center 525. MFT instance 525 may further notify user 517 that a file is waiting to be downloaded. User 517 may authenticate with MFT instance 525 hosted in cloud 505 and download the file from global location server 527, via DMZ 515 and tenant location server 575 in enterprise network 510.

With further reference to FIG. 5, different file transfers may occur across a hybrid on-premises/off-premises MFT system 500 depending on the relative location of users (517, 513, 591, 593, 595), makeup of data centers 520/530/540, MFT server 525, location servers 575/535/527/537/547, and whether users and location servers are on-premises (i.e., on internal network 510) or off-premises (i.e., on external network 505). In file transfer from on-premises sender 517 to on-premises recipient 513, MFT instance server 525 determines the appropriate location server for sender 517 as tenant location server 575 and the appropriate location server for recipient 513 as tenant location server 535. As described herein above, MFT instance server 525 can use one or more approaches to determining the appropriate location servers for users.

In one embodiment, the appropriate location servers for users are predefined in a list which the MFT instance server 525 accesses. In another embodiment, a range of network addresses handled by each location server is maintained. The MFT instance server 525 determines whether a network address of a user's computer is within the range of network addresses of one of the location servers. If so, the location server is determined to be the location server for handling file transfers for the user. In yet another embodiment, location servers and users are geo-located. The location server closest to the user's location is determined to be the location server for handling file transfers for the user.

The MFT instance server 525 initiates a file transfer from user 517 to tenant location server 575 and a file transfer from tenant location server 575 to tenant location server 535. User 513 may be notified that the file is ready for download. As part of the file transfer process, MFT instance server 525 may require authentication by either one or both users 517, 513, for security purposes and/or to ensure proper application of rules and policies governing file transfers, information retention, and data properties.

Hybrid on-premises/off-premises MFT system 500 handles another type of file transfer in which on-premises sender user 517 transfers a file to an off-premises recipient user 591. Here, using one of the aforementioned approaches for determining appropriate location servers, the MFT instance server 525 initiates a file transfer from user 517 to tenant location server 575. MFT instance server 525 then initiates a transfer from tenant location server 575 to global location server 527 assigned to service off-premises user 591. User 591 may then download the file from global location server 527.

Hybrid on-premises/off-premises MFT system 500 handles yet another type of file transfer in which on-premises sender user 517 transfers a file to an off-premises recipient user 595. Here, the MFT instance server 525 initiates a file transfer from user 517 to tenant location server 575. In this instance, MFT instance server 525 determines that no direct connection exists between tenant location server 575 and global location server 547 assigned to user 595 in Rome. However, MFT instance server 525 determines that global location server 527 can serve as an intermediary between tenant location server 575 and global location server 547. MFT instance server 525 then initiates a transfer from tenant location server 575 to global location server 527 and then from server 527 to global location server 547. User 595 may then download the file from global location server 547.

In another embodiment, hybrid on-premises/off-premises MFT system 500 handles another type of file transfer in which off-premises sender user 591 transfers a file to off-premises recipient user 593. Here, the MFT instance server 525 may use the geo-location approach to assign user 591 to global location server 527 and may assign user 593 to global location server 537 based on the fact that the user's network address is within the range of network addresses handled by server 537. The MFT instance server 525 transfers the file from the computer of user 591 to server 547 and then from server 547 to server 537.

In a further embodiment, hybrid on-premises/off-premises MFT system 500 handles another type of file transfer between an off-premises sender user 591 and on-premises recipient user 517. Here, for security reasons, it may not be desirable to transfer the file from an off-premises public network 505 to an on-premises private network 510. For example, hackers may be able to infiltrate private network 510 and pass on viruses to the organization's network if such a file transfer were allowed without further precautions and/or mechanisms to thwart and prevent such attacks. To solve this problem, the file is pulled from the public network 505 to the private network 510. Here, the MFT instance server initiates the file transfer to global location server 527, but does not initiate the transfer to on-premises tenant location server 575. Instead, the tenant location server 575 requests the file from the server 527. In some embodiments, the MFT instance server may send a request to the tenant location server 575 to download the file. In response, the tenant location server 575 initiates a request to download the file from server 527. In further embodiments, tenant location server 575 may require user 517 to authenticate with the transfer system 500 as an added security precaution.

As discussed, embodiments of an MFT system may be cloud based and multi-tenanted. In such cases, components of such a system may be designed to serve multiple clients. Specifically of interest to this example, in some cases each MFT instance at a data center as discussed may runs on a server to serve multiple client-organizations.

For a variety of reasons, in such an MFT architecture it may be desired that users (e.g., at particular tenants or within a client-organization) who utilize MFT on a regular basis (or utilize MFT at all) install at least a portion of the MFT functionality as a native component on their particular user device. Such a native component may implement at least a portion, if not all, of a protocol utilized in the transfer of data by such MFT system or may implement other functionality. The native component may also provide an interface by which a user may send data or perform other actions with respect to the MFT system.

By installing a native component on the user's device in this manner, security and performance may be enhanced, however, such an architecture may raise some issues. For example, it may be the case that the components (including applications) provided from an MFT instance need to communicate with the MFT native component installed on the user's device. It is in such a scenario, among others, where embodiments as disclosed herein may be useful to allow the MFT application to be integrated securely with the MFT native component on the user's device.

Figure 7:
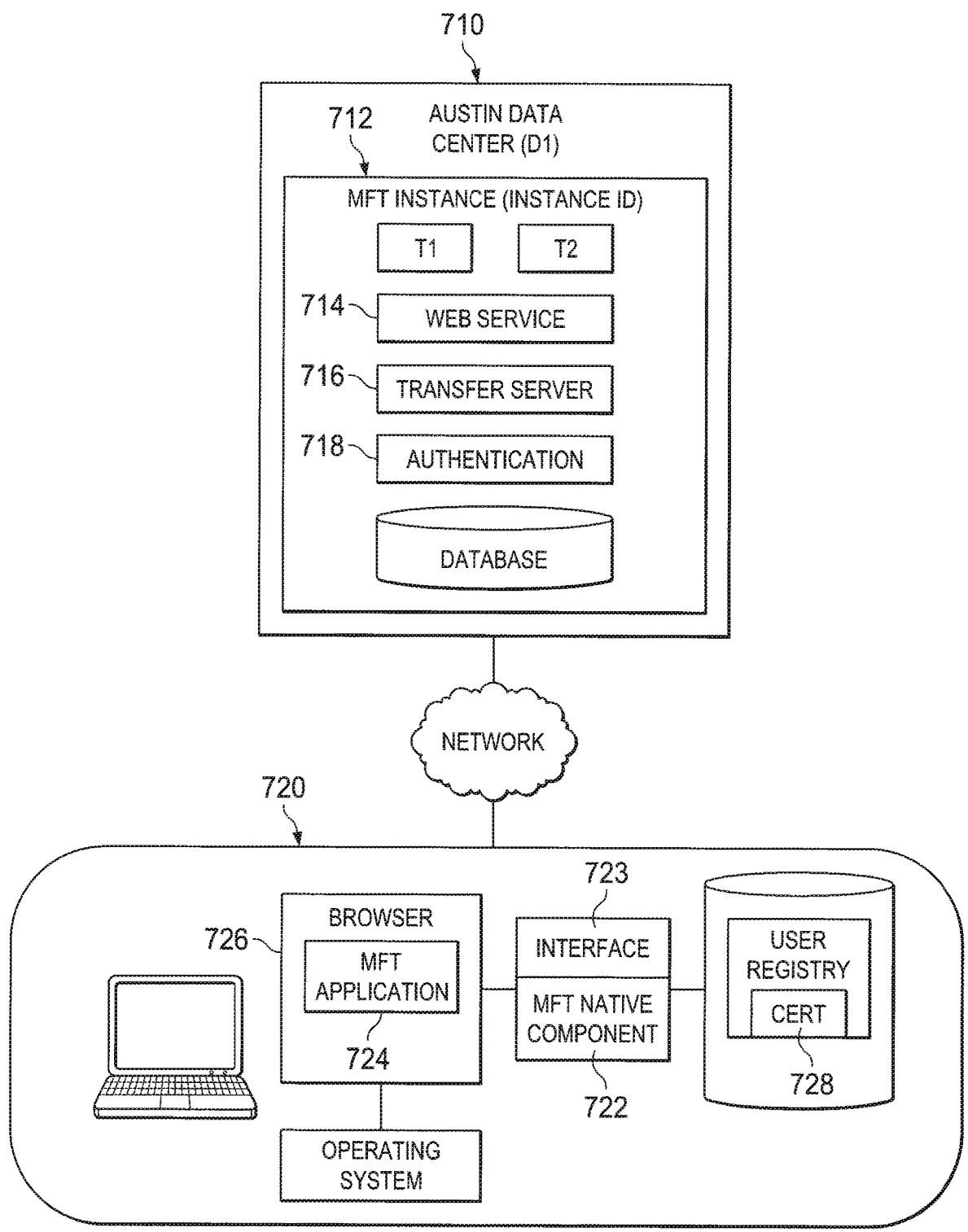
FIG. 7 is a diagrammatic representation of an architecture including an embodiment of component integration in a data transfer architecture.

An embodiment of utilizing a native MFT component along with a browser based MFT application is depicted in FIG. 7. As discussed, MFT instance 712 in a data center 710 may serve multiple tenants (e.g., T1, T2) and include web service module 714, transfer server 716 and authentication module 718. Specifically, in some embodiments transfer server 716 may provide a host of functionality through available services, including various file transfer services or protocol implementations. Transfer server 716 may also provide a service that may serve as a remote authenticator that utilizes SSH/PKI to establish a secure communication channel. Authentication service 718 may be a service that implements a local authenticator as discussed above for members of the domain of MFT instance 712.

Here, the user's computer device 720 may have an MFT native component 722 that implements at least some of the functionality of MFT, including for example at least portions of the protocol that is used when a file is to be transferred to a data center or other components of an MFT system. Such an MFT native component 722 may have been installed during a previous access to MFT instance 712 (e.g., at the prompting of an interface) or at another time. The MFT native component 722 also may be installed with a certificate 728 in the user registry as discussed above.

A user of computing device 720 may access an associated MFT instance 712. For example, a user may receive an email with a link or the like indicating the user is the recipient of a file (e.g., that the user is a recipient of a file sent to the user). By clicking on the link, a user may access the MFT instance 712 or functionality thereof.

In response to this access, the MFT instance 712 may provide a web page or other interface that includes a browser based MFT application 724. Such a browser based MFT application 724 may be executed in conjunction with browser 726. The browser based MFT application 724 may access MFT native component 722 substantially as described above to perform functionality associated with a user's requested accesses or other operations.

To continue with the above example, the browser based MFT application 724 may (after, for example, verifying the MFT native component 722 is installed on the computing device 720) send a request through interface 723 of MFT native component 722 with an identifier of the file and a request to download or otherwise transfer the file. The MFT native component 722 may contact the MFT instance 712 or another component of the MFT architecture with the identifier for the file (and possibly a security token for the user). The MFT native component 722 can then download this file to the user's device 720 from the MFT instance 712 (or other component) using the protocol implemented by the MFT native component 722 and may then notify the MFT application 724 that such an operation has been completed (or another response).

Those skilled in the relevant art will appreciate that the invention can be implemented or practiced with other computer system configurations, including without limitation multi-processor systems, network devices, mini-computers, mainframe computers, data processors, and the like. The invention can be embodied in a general purpose computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention.

Rather, the description is intended to describe illustrative embodiments, features, and functions in order to provide a person of ordinary skill in the art context to understand the invention without limiting the invention to any particularly described embodiment, feature, or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention. For example, it will be understood that while embodiments as discussed herein are presented in the context of a browser based application other embodiments may be applied with equal efficacy to other types of components on computing device (e.g., other native components, etc.).

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A system, comprising:
    a device comprising:
        a first component providing a network interface adapted to allow functionality of the first component to be accessed via the network interface; and
        a non-transitory computer readable medium, comprising instructions for:
            receiving, at the first component, a request from a requesting second component executing on the device, the request received via the network interface provided by the first component;
            determining, by the first component, a first user session identifier associated with the execution of the first component on the device;
            determining a connection associated with the request received from the requesting second component;
            determining a process identifier associated with the requesting second component based on the determined connection associated with the request;
            using the determined first user session identifier and the determined process identifier, determining whether the request originated from a user space on the first component that is associated with both the determined first user session identifier and the determined process identifier; and
            in response to determining whether the request originated from a user space on the first component that is associated with both the determined first user session identifier and the determined process identifier, determining whether to allow the request.

2. The system of claim 1, wherein if the request originated from a user space on the first component that is associated with both the determined first user session identifier and the determined process identifier, allowing the request.

3. The system of claim 2, wherein the first component is adapted to service the allowed request.

4. The system of claim 3, wherein the first component is adapted to return a result after servicing the allowed request.

5. The system of claim 1, wherein if the request did not originate from a user space on the first component that is associated with both the determined first user session identifier and the determined process identifier, not allowing the request.

6. The system of claim 1, wherein the first component is adapted to listen to local ports of the device.

7. The system of claim 6, wherein the first component is adapted to only accept connection requests from a local host interface.

8. A method, comprising:
    receiving, at a network interface of a first component on a device, a request from a requesting component residing locally on the device;
    allowing functionality of the first component to be accessed through the network interface;
    determining, by the first component, a first user session identifier associated with the execution of the first component on the device;

determining a connection associated with the request received from the requesting component;

determining a process identifier associated with the requesting component based on the determined connection associated with the request;

using the determined first user session identifier and the determined process identifier, determining whether the request originated from a user space on the first component that is associated with both the determined first user session identifier and the determined process identifier; and in response to determining whether the request originated from a user space on the first component that is associated with both the determined first user session identifier and the determined process identifier, determining whether to allow the request.

9. The method of claim 8, wherein if the request originated from a user space on the first component that is associated with both the determined first user session identifier and the determined process identifier, allowing the request.

10. The method of claim 9, wherein the first component is adapted to service the allowed request.

11. The method of claim 10, wherein the first component is adapted to return a result after servicing the allowed request.

12. The method of claim 8, wherein if the request did not originate from a user space on the first component that is associated with both the determined first user session identifier and the determined process identifier, not allowing the request.

13. The method of claim 8, wherein the first component is adapted to listen to local ports of the device.

14. The method of claim 13, wherein the first component is adapted to only accept connection requests from a local host interface.

15. A non-transitory computer readable medium, comprising instructions for:

receiving, at a network interface of a first component on a device, a request from a requesting component residing locally on the device;

allowing functionality of the component to be accessed through the network interface;

determining, by the first component, a first user session identifier associated with the execution of the first component on the device;

determining a connection associated with the request received from the requesting component;

determining a process identifier associated with the requesting component based on the determined connection associated with the request;

using the determined first user session identifier and the determined process identifier, determining whether the request originated from a user space on the first component that is associated with both the determined first user session identifier and the determined process identifier; and in response to determining whether the request originated from a user space on the first component that is associated with both the determined first user session identifier and the determined process identifier, determining whether to allow the request.

16. The non-transitory computer readable medium of claim 15, wherein if the request originated from a user space on the first component that is associated with both the determined first user session identifier and the determined process identifier, allowing the request.

17. The non-transitory computer readable medium of claim 15, wherein the first component is adapted to service the allowed request.

18. The non-transitory computer readable medium of claim 17, wherein the first component is adapted to return a result after servicing the allowed request.

19. The non-transitory computer readable medium of claim 18, wherein if the request did not originate from a user space on the first component that is associated with both the determined first user session identifier and the determined process identifier, not allowing the request.

20. The non-transitory computer readable medium of claim 15, wherein the first component is adapted to listen to local ports of the device.

21. The non-transitory computer readable medium of claim 20, wherein the first component is adapted to only accept connection requests from a local host interface.

* * * * *